(12) United States Patent
Akiba et al.

(10) Patent No.: US 6,542,695 B1
(45) Date of Patent: Apr. 1, 2003

(54) VIDEO SIGNAL RECORDING/ REPRODUCTION APPARATUS AND METHOD WITH MULTI-PICTURE DISPLAY

(75) Inventors: Toshiya Akiba, Kanagawa (JP); Takao Takahashi, Tokyo (JP); Masashi Ohta, Tokyo (JP); Toshimichi Hamada, Tokyo (JP); Taro Suito, Kanagawa (JP); Masami Tomita, Chiba (JP); Katsunari Miyata, Tokyo (JP); Koichi Chotoku, Tokyo (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/163,222

(22) Filed: Sep. 29, 1998

(30) Foreign Application Priority Data

Oct. 1, 1997 (JP) .............................................. 9-268981

(51) Int. Cl.[7] ........................... H04N 5/781; H04N 5/91
(52) U.S. Cl. ......................................... 386/125; 386/92
(58) Field of Search ................................. 386/1, 38, 46, 386/117, 92, 125–126; 348/207, 333.05, 594–595; 358/906, 909.1

(56) References Cited

U.S. PATENT DOCUMENTS

| | | | | |
|---|---|---|---|---|
| 4,665,438 A | * | 5/1987 | Miron et al. ................. | 348/567 |
| 4,768,083 A | * | 8/1988 | Romesburg ................. | 348/600 |
| 4,890,168 A | * | 12/1989 | Inoue et al. ................. | 358/335 |
| 5,177,801 A | * | 1/1993 | Shoda et al. ................. | 381/119 |
| 5,189,563 A | * | 2/1993 | Breslau et al. ................. | 386/53 |
| 5,271,011 A | * | 12/1993 | McMullan, Jr. et al. .... | 714/807 |
| 5,371,551 A | * | 12/1994 | Logan et al. ................ | 348/571 |
| 5,432,561 A | * | 7/1995 | Strubbe ....................... | 348/565 |
| 5,481,411 A | * | 1/1996 | Nakatani ........................ | 386/4 |
| 5,539,527 A | * | 7/1996 | Kajimoto et al. .............. | 386/52 |
| 5,625,410 A | * | 4/1997 | Washino et al. ............. | 348/154 |
| 5,625,504 A | * | 4/1997 | Okada et al. ................. | 360/27 |
| 5,701,383 A | * | 12/1997 | Russo et al. .................. | 386/46 |
| 5,802,226 A | * | 9/1998 | Dischert et al. .............. | 386/53 |
| 5,915,066 A | * | 6/1999 | Katayama ..................... | 386/70 |
| 5,974,220 A | * | 10/1999 | Kajimoto ...................... | 386/52 |
| 6,018,612 A | * | 1/2000 | Thomason et al. ........... | 386/82 |
| 6,169,842 B1 | * | 1/2001 | Pijnenburg et al. ........... | 386/46 |
| 6,172,715 B1 | * | 1/2001 | Cho ............................ | 348/565 |
| 6,233,389 B1 | * | 5/2001 | Barton et al. ................. | 386/46 |
| 6,304,714 B1 | * | 10/2001 | Krause et al. ................ | 386/52 |

FOREIGN PATENT DOCUMENTS

| | | | |
|---|---|---|---|
| WO | 92/22983 | * | 12/1992 |
| WO | 96/33579 | * | 10/1996 |

OTHER PUBLICATIONS

Kageyama et al., "A Free Time–Shift DVD Video Recorder", Jun. 13, 1997, pp. 469–473. IEEE Transactions on Consumer Electronics, vol. 43, No. 3.*

* cited by examiner

*Primary Examiner*—Andrew Christensen
*Assistant Examiner*—Polin Chieu
(74) *Attorney, Agent, or Firm*—Frommer Lawrence & Haug LLP; William S. Frommer; Glenn F. Savit

(57) ABSTRACT

A video signal recording/reproduction apparatus utilizes time division writing and reading to implement simultaneous recording and reproduction of different video signals to and from a common recording medium. In one operating mode, a first video signal being recorded and a second video signal being reproduced are simultaneously displayed in separate windows on a display. In other operating modes, two or more video signals are simultaneously recorded or reproduced to/from a common recording medium, and simultaneously displayed in separate windows.

10 Claims, 15 Drawing Sheets

REPRODUCTION COMPLETE

REPRODUCTION 2
COMPLETE

VIDEO SIGNAL RECORDING/REPRODUCTION APPARATUS AND METHOD WITH MULTI-PICTURE DISPLAY

BACKGROUND OF THE INVENTION

1. Field of the Invention

The present invention relates to a signal recording and/or reproduction apparatus and method for recording and/or reproducing a video signal or a video signal in combination with an audio signal to/from a recording medium; a signal recording apparatus and method for recording onto a recording medium video signals through a plurality of channels or a video signal in combination with an audio signal through a plurality of channels; and a signal reproduction apparatus and method for reproducing from a recording medium video signals through a plurality of channels or a video signal in combination with an audio signal through a plurality of channels.

2. Description of the Prior Art

Recently, there has been suggested a simultaneous signal recording/reproduction apparatus for recording a video signal or a video signal in combination with an audio signal onto a recording medium such as an optical disc simultaneously with carrying out a reproduction, or a two-channel reproduction apparatus for reproducing simultaneously a video signal and an audio signal of two channels from a recording medium.

In the aforementioned simultaneous recording/reproduction apparatus and in the two-channel reproduction apparatus, no user interface has been provided for correlating the video signals simultaneously inputted/outputted for display. However, if a video signal recorded and a video signal reproduced are displayed independently from each other, i.e., video signal of separate channels are displayed separately, the benefit for a user is not sufficient.

For example, in a simultaneous signal recording/reproduction apparatus, it is difficult for the user to visually recognize the timing when the difference between the recording and the reproduction has become zero.

SUMMARY OF THE INVENTION

It is therefore an object of the present invention to provide a signal recording and/or reproduction apparatus capable of visually showing the relationship between a video signal recorded and a video signal reproduced when a video signal is recorded and/or reproduced to/from a recording medium.

According to another aspect of the present invention, there is provided a signal recording apparatus and method capable of recording video signals of two channels onto a recording medium while visually showing the relationship between the video signals of the two channels.

According to still another aspect of the present invention, there is provided a signal reproduction apparatus and method capable of reproducing video signals of two channels from a recording medium while visually showing the relationship of the video signals of the two channels.

In order to achieve the aforementioned object, the signal recording and/or reproduction apparatus according to the present invention includes: recording processing means for carrying out a recording signal processing to a video signal to be recorded on the recording medium; reproduction processing means for carrying out a reproduction signal processing to a video signal to be reproduced from the recording medium; and control means for causing display means to output a recording video signal to be recorded on the recording medium via the recording processing means and a reproduction video signal reproduced from the recording medium via the reproduction processing means. This enables a user to visually recognize the relationship of the two video signals simultaneously recorded and reproduced to/from the recording medium.

Moreover, the signal recording apparatus according to the present invention includes: recording processing means for carrying out a recording signal processing to a video signal to be recorded onto the recording medium; and control means for causing display means to output a plurality of video signals or a portion of a video signal to be recorded onto the recording medium via the recording processing means according to the multiple recording mode or the partial recording mode. This enables a user to visually recognize the relationship of the two video signals recorded in two channels onto the recording medium.

Furthermore, the signal reproduction apparatus according to the present invention includes: reproduction processing means for carrying out a reproduction signal processing to a video signal reproduced from the recording medium; and control means for causing display means to output a plurality of video signals or a portion of a video signal reproduced from the recording medium via the reproduction processing means according to the multiple reproduction mode or the partial reproduction mode. This enables a user to visually recognize the relationship of the two video signals of the two channels from the recording medium.

Moreover, the signal recording and/or reproduction method according to the present invention is characterized in that a display block outputs a video signal to be recorded on the recording medium or video signal reproduced from the recording medium. This enables to simultaneously display two video signals which are simultaneously recorded and reproduced onto/from the recording medium.

Moreover the signal recording method according to the present invention is characterized in that a display block outputs the plurality of video signals or the part of a video signal according to the multiple recording mode or the partial recording mode. This enables to simultaneously display two video signals of two channels recorded onto the recording medium.

Furthermore, the signal reproduction method according to the present invention is characterized in that control is made to cause a display block to output a plurality of video signals or a portion of a video signal reproduced from the recording medium via reproduction processing means according to a multiple reproduction mode or a partial reproduction mode.

DETAILED DESCRIPTION OF THE PREFERRED EMBODIMENTS

Description will now be directed to a signal recording and/or reproduction apparatus and method, a signal recording apparatus and method, and a signal reproduction apparatus and method according to an embodiment of the present invention with reference to the attached drawings. This embodiment is a video signal recording and/or reproduction apparatus capable of simultaneously recording and reproducing a video signal to/from a recording medium such as an optical disc and simultaneously recording or reproducing video signals of two channels.

Figure 1:
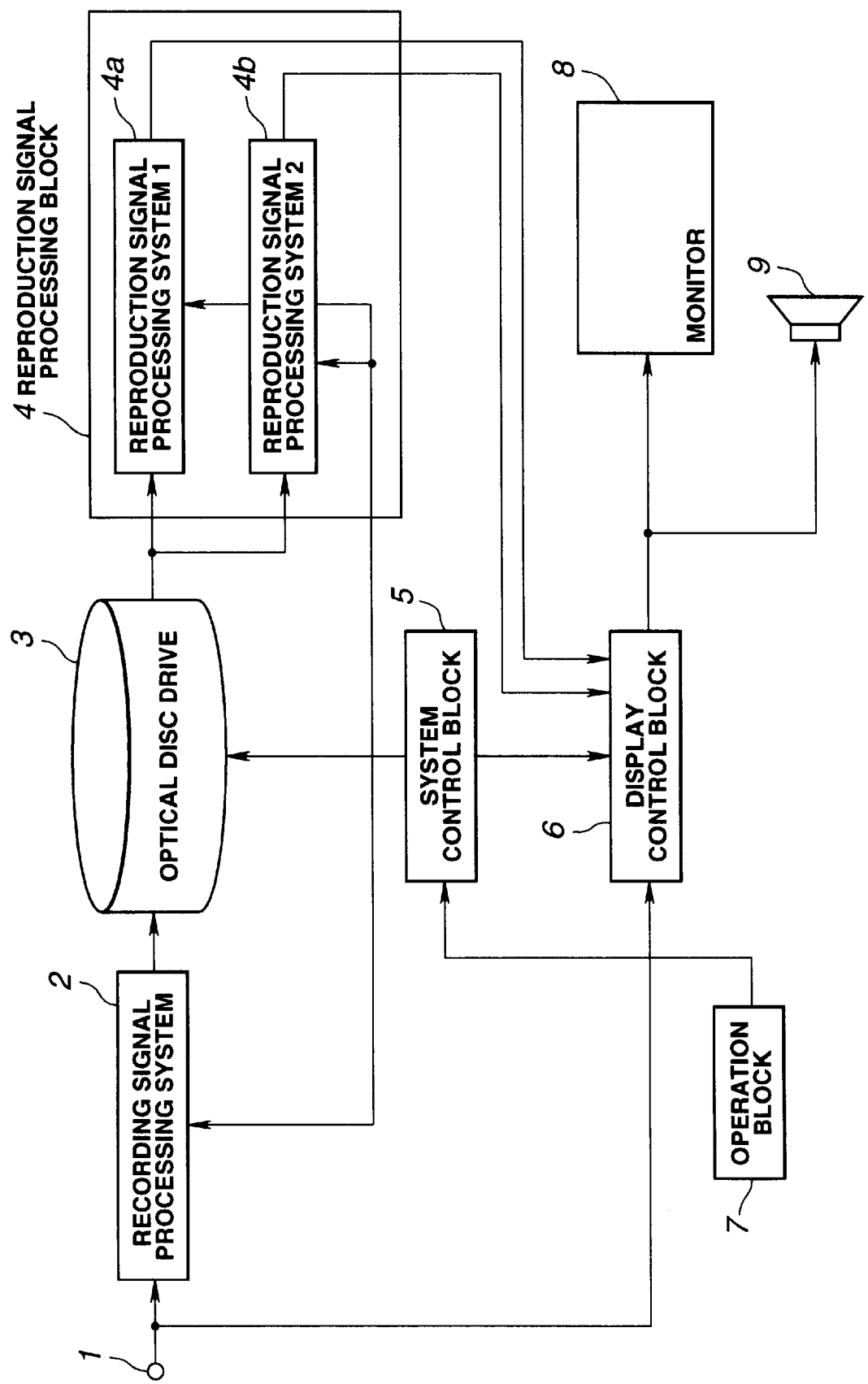
FIG. 1 is a block diagram showing a signal recording and/or reproduction apparatus and method, a signal recording apparatus and method, and a signal reproduction apparatus and method according to an embodiment of the present invention.

As shown in FIG. 1, this video signal recording and/or reproduction apparatus includes: a recording signal processing system 2 for carrying out a recording signal processing to a video signal inputted from an input terminal 1; an optical disc drive 3 for time-division writing and reading to/from an optical disc the video signal which has been subjected to the recording signal processing by the recording signal processing system 2; a reproduction signal processing block 4 for carrying out a reproduction signal processing to the recorded video signal which has been read out by the optical disc drive 3; a monitor 8 for displaying a video signal during recording and a video signal during reproduction; an operation block 7 for selecting by a user a record mode for specifying a video signal recording and a reproduction mode for specifying a reproduction as a recording and/or reproduction mode; a system control block 5 having a mode detecting function for detecting the recording mode and/or reproduction mode selected by the operation block 7; and a display control block 6 for controlling display of a monitor 8 according to the aforementioned mode detected by the system control block 5.

Here, the system control block 5 has the aforementioned mode detecting function and controls operations of the aforementioned recording signal processing system 2, the optical disc drive 3, the reproduction signal processing block 4, and the display control block 6. For example, if both of the recording mode and the reproduction mode are selected by the operation block 7 the system control block 5 controls the display control block 6 to cause the display block 8 to display both of a video signal during the recording and a recorded video signal during the reproduction. Moreover, if the Two-channel Simultaneous Reproduction mode is selected by the operation block 7, the system control block 5 controls the display control block 6 to cause the display block 8 to simultaneously display the reproduced video signal of the two channels. Moreover, when the video signal recording and/or reproduction apparatus carries out recording/reproduction of an audio signal also, the system control block 5 causes speaker 9 to output the audio signal.

The reproduction signal processing block 4 includes a first reproduction signal processing system 4a and a second reproduction signal processing system 4b and has a function for carrying out a reproduction signal processing to video signals of two channels for simultaneously reproducing the video signals of two channels.

Figure 2:
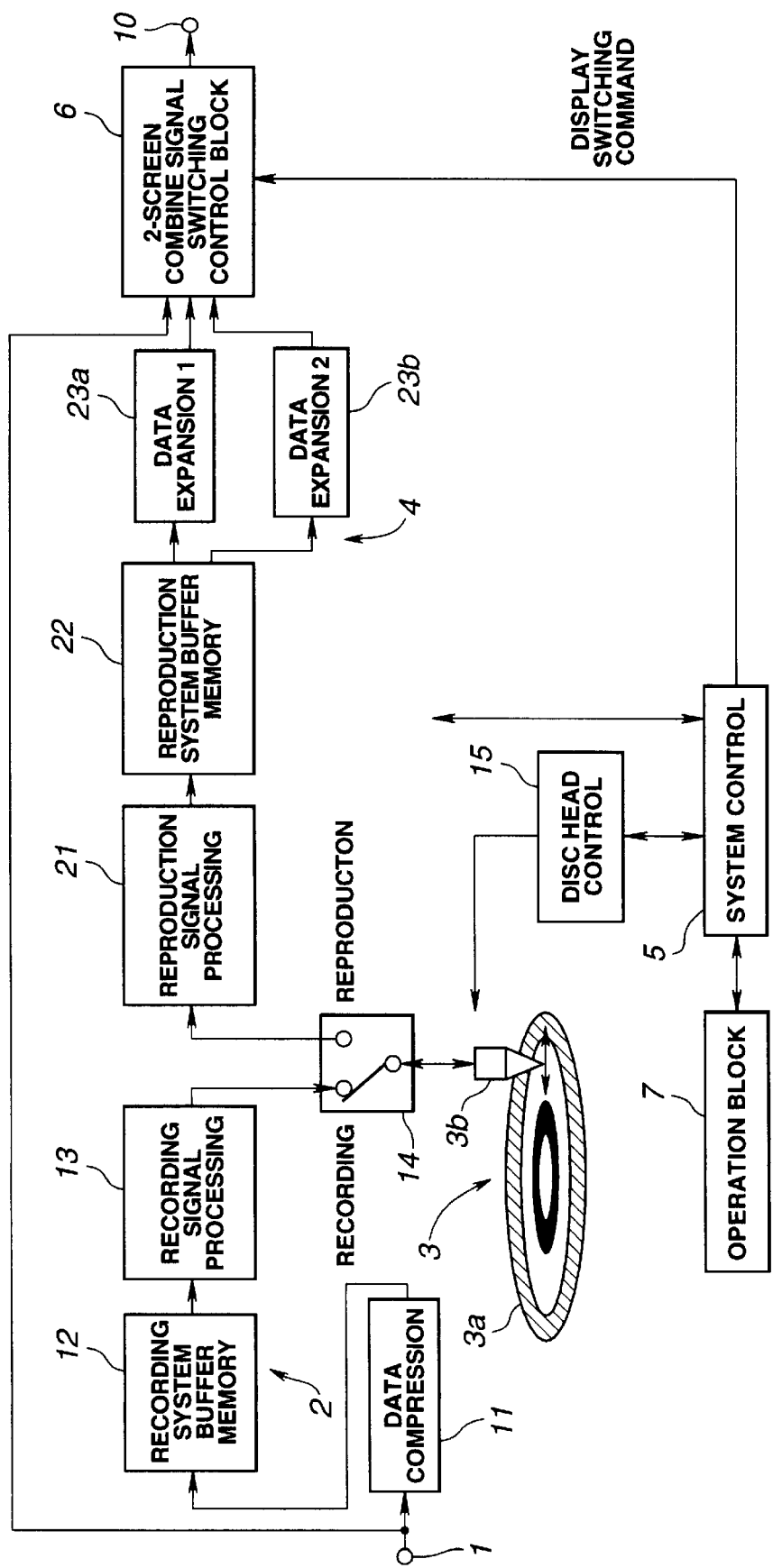
FIG. 2 shows a detailed configuration of a video signal recording and/or reproduction apparatus shown in FIG. 1.

FIG. 2 shows a detailed configuration of the aforementioned video signal recording and/or reproduction apparatus. The recording signal processing system 2 includes: a data compression block 11 for carrying out a data compression such as MPEG and JPEG to a video signal inputted from the input terminal 1; a recording system buffer memory 12 for temporarily writing and reading out the compressed video data from the data compression block 11; and a recording signal processing block 13 for carrying out a recording signal processing to the compressed video data which has been read out from the recording system buffer memory 12.

Moreover, the reproduction signal processing system 4 includes: a reproduction signal processing block 21 for carrying out a reproduction signal processing to the compressed video data which has been read out by the optical disc drive 3; a reproduction system buffer memory 22 for temporarily writing and reading out the compressed video data from the reproduction signal processing block 21; and a first data expansion system 23a and a second data expansion system 23b for carrying out two different data expansion processes to the compressed video data from the reproduction system buffer memory 22.

Moreover, the optical disc drive 3 includes; an optical disc 3a; and an optical head 3b to which a recording or reproduction laser beam is applied for recording or reproducing the aforementioned compressed video data. The optical head 3b is switched by a selector switch 14 so as to be connected to the aforementioned recording signal processing system 2 or to the reproduction signal processing system 4 during a recording or reproduction.

Moreover, the optical disc drive 3 is controlled by a disc/head control block 15 for the rotation of the optical disc 3a and the head operation such as tracking servo and focus servo.

Moreover, in this FIG. 2, the aforementioned display control block 6 serves as a two-screen combine signal switching control block 6 for controlling to switch between signals of two screens during a simultaneous recording/reproduction or two-channel simultaneous reproduction.

Figure 3:
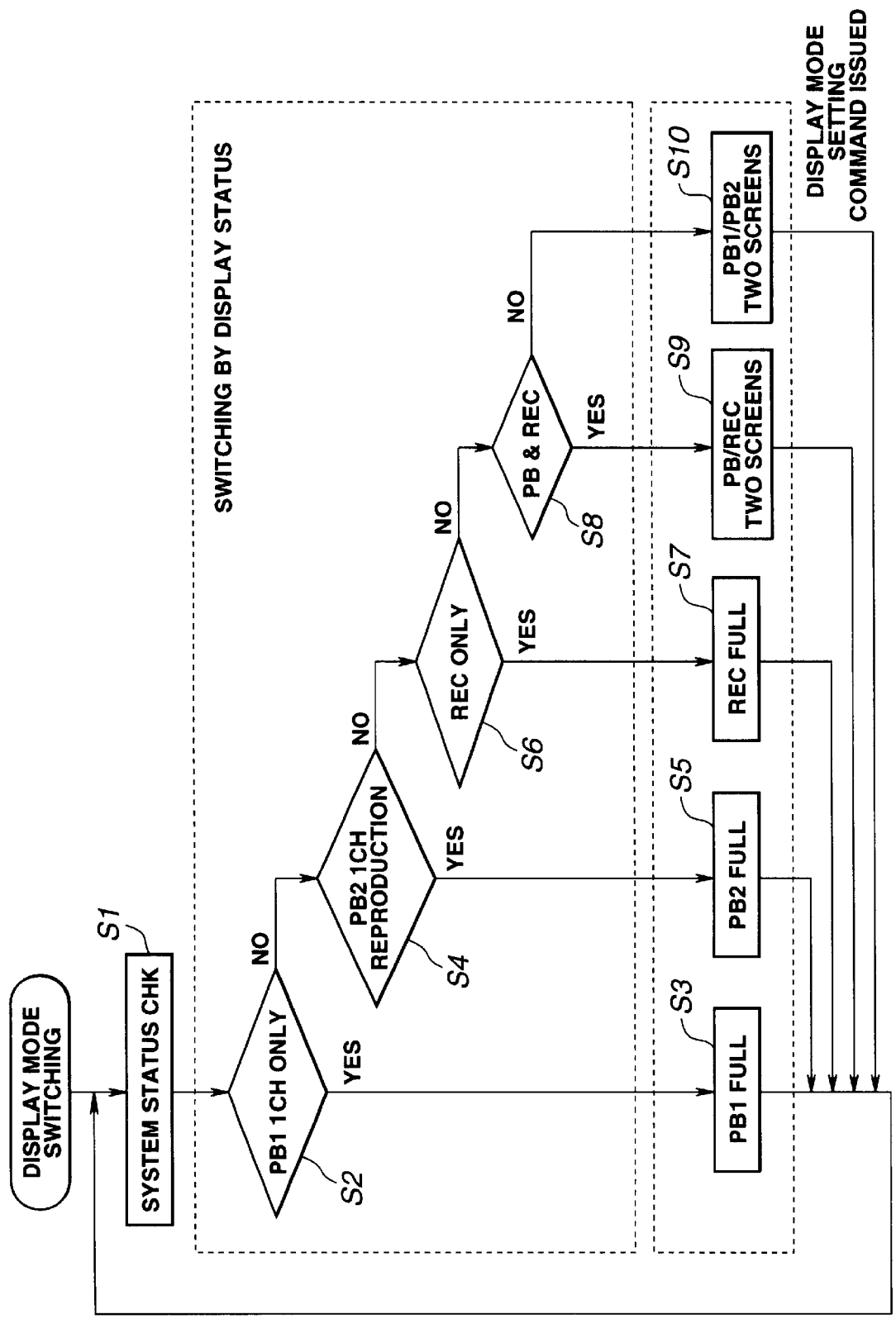
FIG. 3 is a flowchart describing an operation of the aforementioned video signal recording and/or reproduction apparatus.
Figure 4:
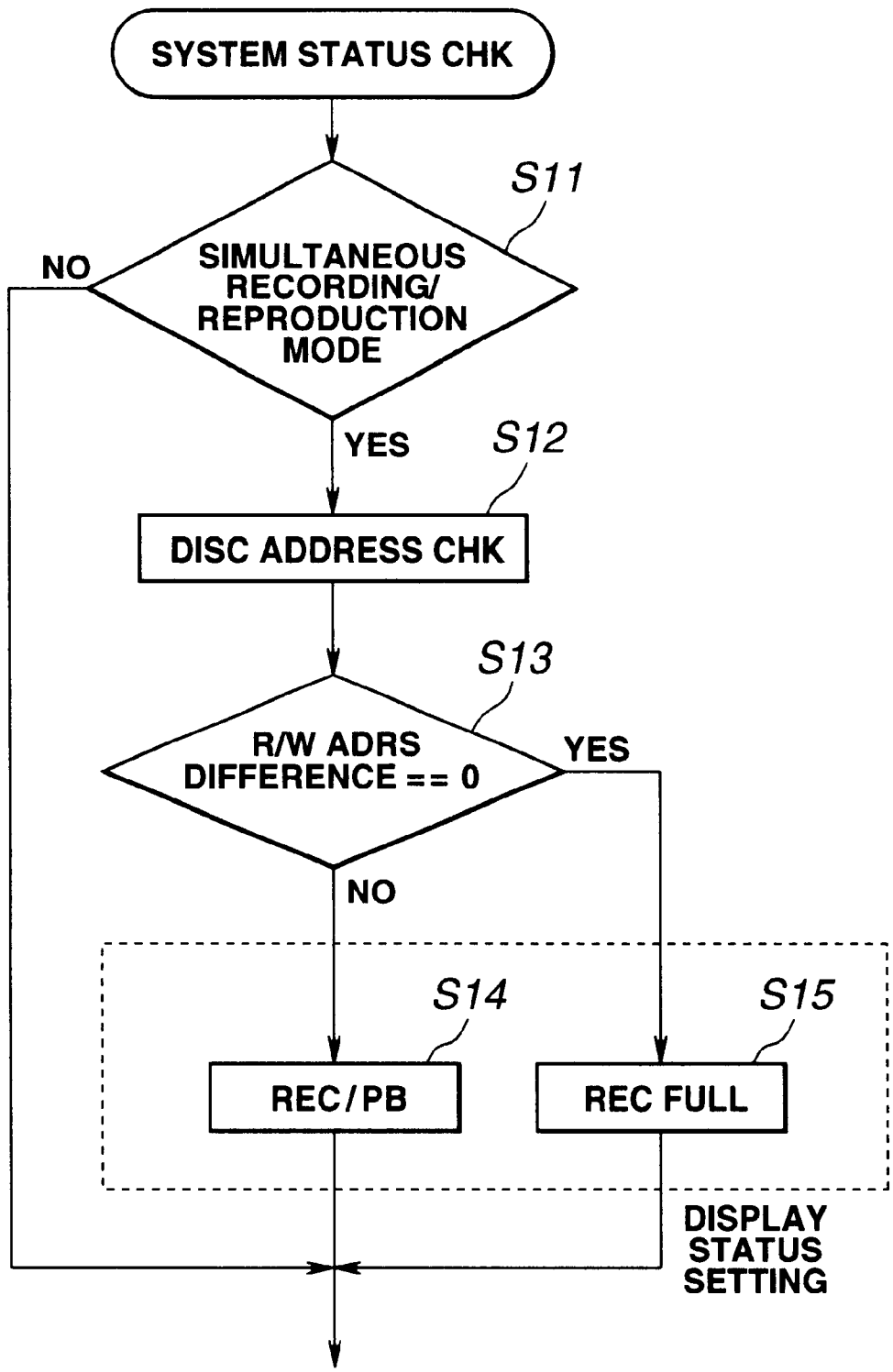
FIG. 4 is another flowchart describing an operation of the aforementioned video signal recording and/or reproduction apparatus.

Description will now be directed to a switching operation between screen display on the monitor controlled by the system control block 5 via the display control block 6 with reference to FIG. 3 and FIG. 4. Here, explanation will be given, assuming that the aforementioned video signal recording and/or reproduction apparatus are to carry out both of the aforementioned simultaneous recording/reproduction and simultaneous two-channel reproduction. It should be noted that each of the simultaneous recording/reproduction and the simultaneous two-channel reproduction is identified in a system status check of step S1 by system control block 5 according to the mode selection difference in the operation block 7.

FIG. 4 shows a subroutine of this system status check. In step S11, if the system control block 5 decides that the simultaneous recording/reproduction mode has been selected by the operation block 7, control is passed to step S12 to check a disc address of the optical disc 3a in the optical disc drive 3.

Here, as shown in step S13, the system controller block 5 decides whether an address difference between the recording and the reproduction is 0. Unless the address difference is zero as shown in step S14, a video signal of the recording and the reproduction is displayed on the monitor 8. If the address difference is zero as shown in step S15, the video signal of the recording alone is displayed in full screen on the monitor 8. Then, control is passed to step S2 and after for switching processing according to a display status.

In the aforementioned step S11, if it is decided that other than the simultaneous recording/reproduction mode has been selected, i.e., only recording or two-channel simultaneous reproduction has been selected in the operation block 7, then control is passed to step S2 of FIG. 3 and after for switching according to the display status.

Figure 5:
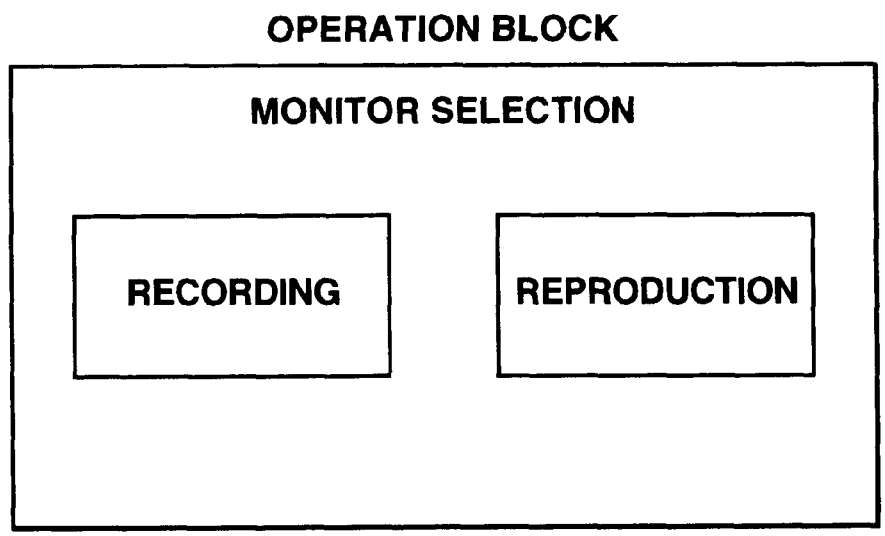
FIG. 5 shows selection of a two-channel reproduction mode in an operation block of the aforementioned signal recording and/or reproduction apparatus.
Figure 6:
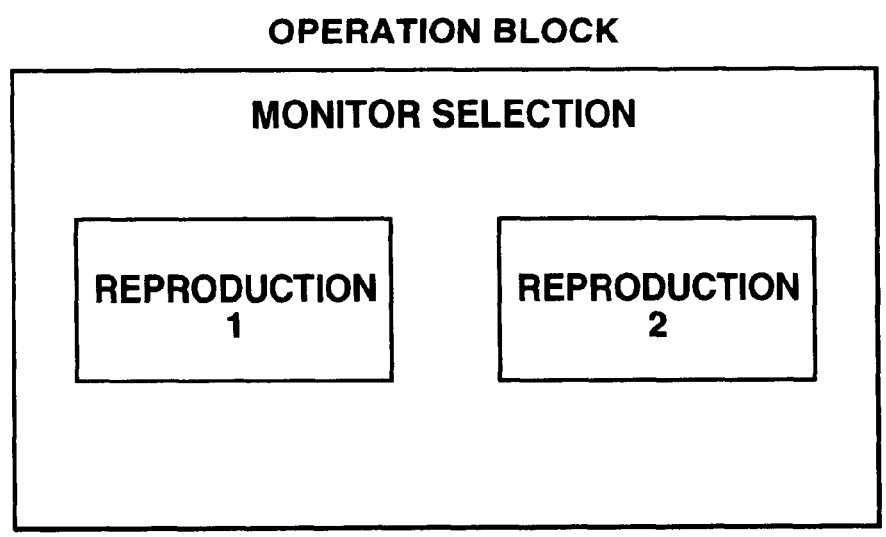
FIG. 6 shows selection of the two-channel reproduction mode in the operation block of the aforementioned signal recording and/or reproduction apparatus.

In the steps S2 and after in FIG. 3, show the processing of display mode setting commands issued by the system control block 5 to the display control block 6 when the display status is selected in the operation block 7 with Recording, Reproduction, Reproduction 1, and Reproduction 2 switches on the monitor select display as shown in FIG. 5 and FIG. 6.

As shown in step S2, if the "Reproduction 1" alone is selected on the monitor select display on the operation block 7 of FIG. 6, control is passed to step S3 where the system control block 5 issues to the display control block 6 a command for full display of only a video signal of one channel specified by the "Reproduction 1".

Moreover, as shown in step S4, if the "Reproduction 2" alone is selected on the monitor select display on the operation block 7 of FIG. 6, control is passed to step S5 where the system control block 5 issues to the display control block 6 a command for a fill screen display of only a video signal of one channel specified by the "Reproduction 2".

Moreover, as shown in step S6, if the "Recording" alone is selected on the monitor select on the operation block 7 of FIG. 5, control is passed to step S7 where the system control block 5 issues to the display control block 6 a command for full display of a video signal specified only for "Recording".

Moreover, as shown in step S8, if both of the "Recording" and the "Reproduction" are selected on the monitor select display on the operation block 7 of FIG. 5, control is passed to step S9, where the system control block 5 issues to the display control block 6 a command for displaying two screens of "Recording" and "Reproduction".

After the decisions made in the step S2, step S4, and step S6, if NO occurs finally in step S8, it is decided that the two-channel simultaneous reproduction mode is specified for reproduction of the two screens of "Reproduction 1" and "Reproduction 2" on the monitor select display on the operation block 7, and control is passed to step S10 for issuing a command for displaying two screens of two-channel simultaneous reproduction.

Figure 7A:
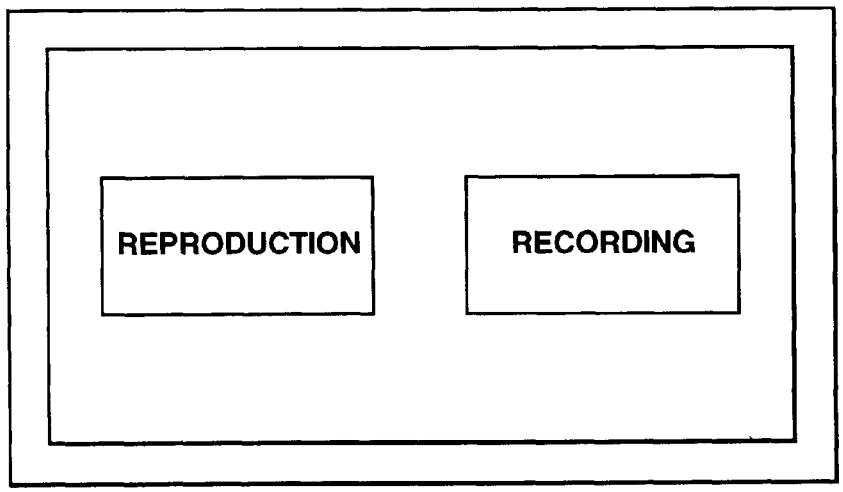
FIG. 7 shows a display when the recording/reproduction mode is selected and a display when a reproduction is complete in the aforementioned video signal recording and/or reproduction apparatus.
Figure 7B:
Figure 7B:
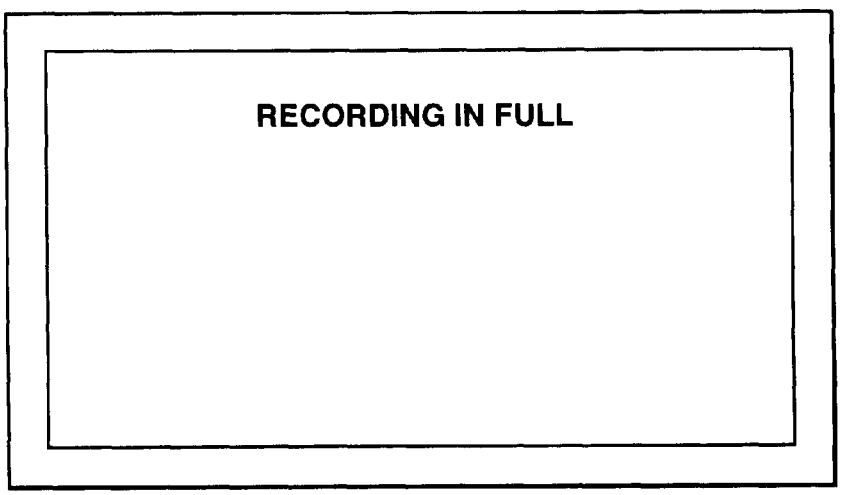

In the aforementioned video signal recording/reproduction apparatus, if the system control block 5 issues to the display control block 6 the command of simultaneous recording/reproduction in step S9 of FIG. 3, the display control block 6 simultaneously displays two screens of a recording video signal from the input terminal 1 and a reproduction video signal from the reproduction signal processing block 4 as shown in FIG. 7A. Here, the recording and the reproduction are carried at an identical speed. In this state, if a user stops the reproduction through the operation of the operation block 7, only the recording video signal is displayed in full as shown in FIG. 7B.

Moreover, if it has been specified to carry out the reproduction faster than the recording, the system control block 5, as shown in step S12, carries out a disc address check. When the address difference between the write-in and the read-out to/from the optical disc 3a has become zero in step S13, control is passed to step S15 where the full screen display of the recording video signal is automatically set as shown in FIG. 7B. Here, the address difference zero between the write-in and the read-out means that the reproduction has been completed. This will be applied during a catch-up reproduction which will be detailed later.

Moreover, it is also possible to simultaneously reproduce using the reproduction signal processing block 4 a video signal which is being recorded using the optical disc drive 3 on an optical disc 3a so that the reproduced video signal is displayed for monitoring together with the video signal being recorded as shown in FIG. 7A. If the monitoring is terminated, only the recording video signal is displayed in full screen as shown in FIG. 7B.

Figure 8A:
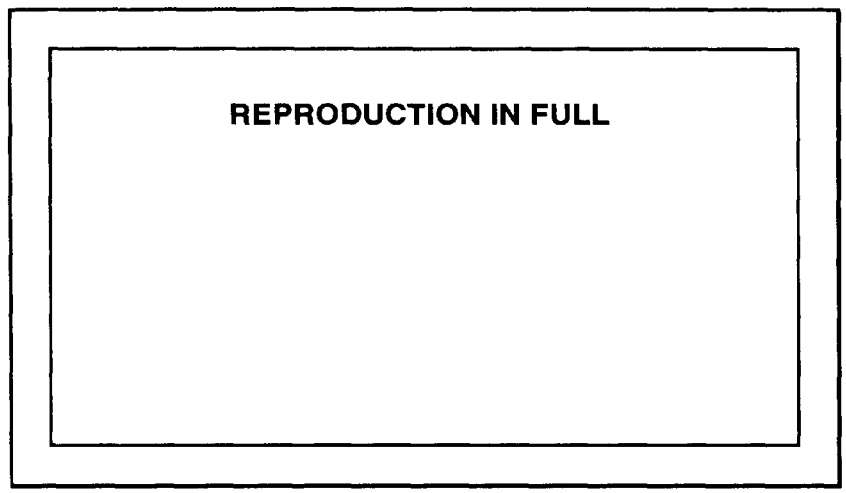
FIG. 8 shows a display when the recording/reproduction mode is selected from a Reproduction Full display in the aforementioned video signal recording and/or reproduction apparatus.
Figure 8B:
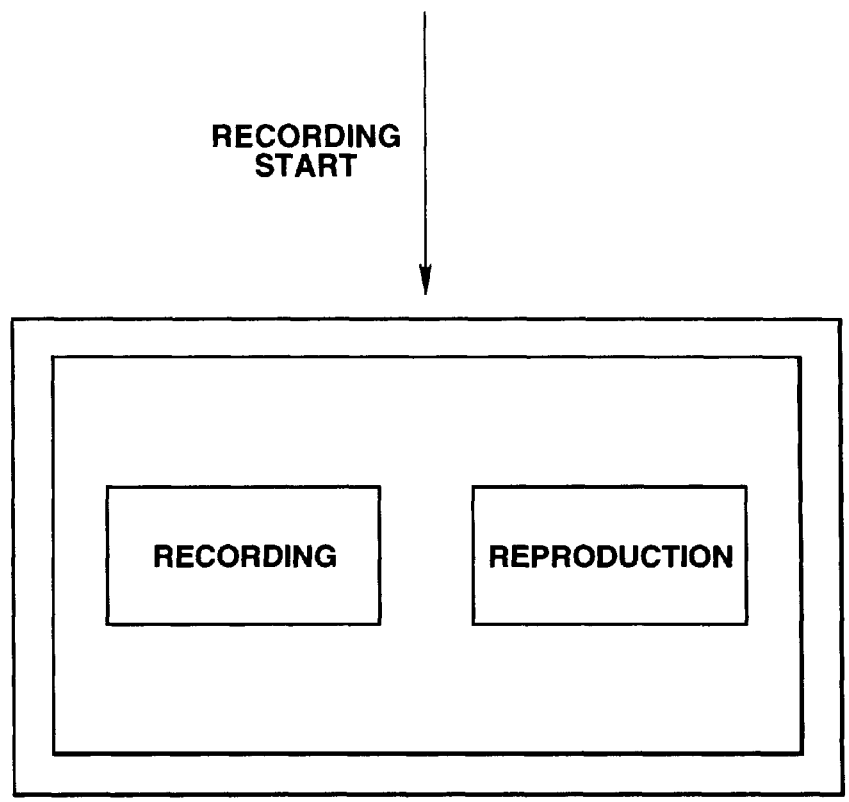

On the other hand, the system control block 5 which has issued a command in step S3 or in step S5 controls to carry out a full display of the reproduction video signal alone as shown in FIG. 8A. In this state, if the recording mode is further selected, i.e., if the simultaneous recording/reproduction mode is set, both of the recording video signal and the reproduction video signal are displayed on the monitor 8 as shown in FIG. 8B.

Figure 9A:
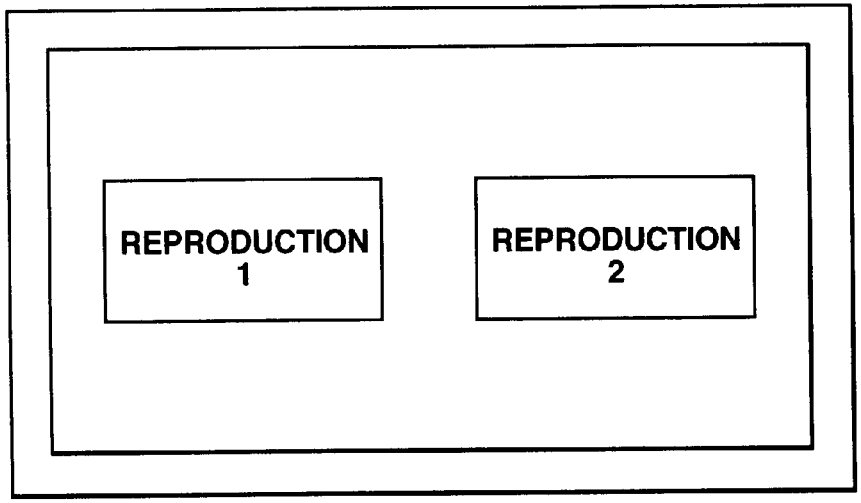
FIG. 9 shows a display of a Two-channel Simultaneous Reproduction and a display when one of the reproductions is complete in the aforementioned video signal recording and/or reproduction apparatus.
Figure 9A:
Figure 9B:
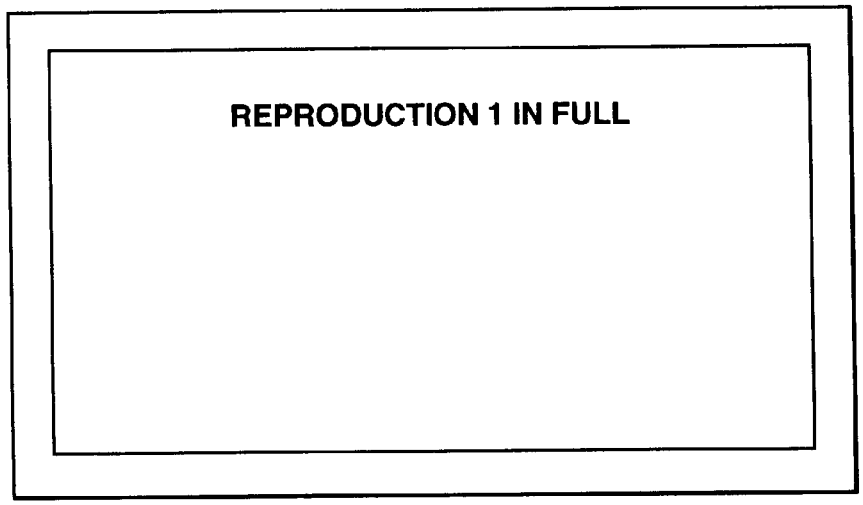

Moreover, when the system control block 5 has issued a command for two-screen simultaneous display as shown in step S10, the display control block 6 causes the monitor 8 to display two reproduction video signals as shown in FIG. 9A. However, when the reproduction signal of Reproduction 2 is complete, only the video signal of Reproduction 1 is displayed in full screen as shown in FIG. 9B.

Thus, in the aforementioned video signal recording and/or reproduction apparatus, during a simultaneous recording/reproduction or two-channel recording/reproduction, for example, it is possible to visually show the relationship between the two video signals. This enables a user to recognize the relationship between the two signals.

Figure 10:
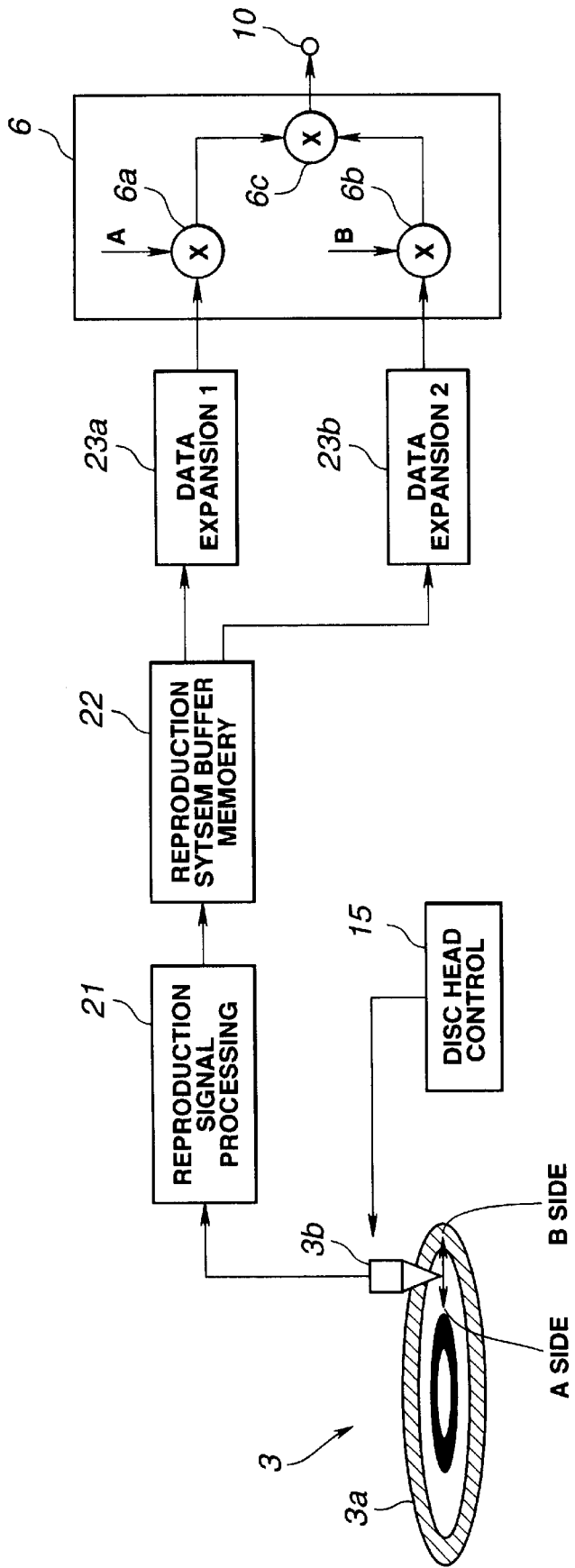
FIG. 10 is a block diagram showing a detailed configuration of a display control block in the aforementioned video signal recording and/or reproduction apparatus when a cross fade processing and a fade-out/fade-in processing are carried out.
Figure 11A:
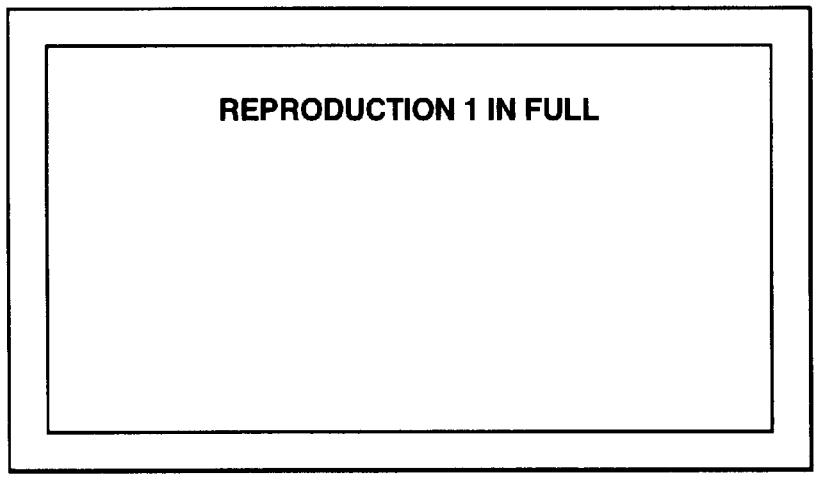
FIG. 11 shows a reproduced video signal after subjected to the cross fade processing or the fade-out/fade-in processing by the display control block shown in FIG. 10.
Figure 11B:
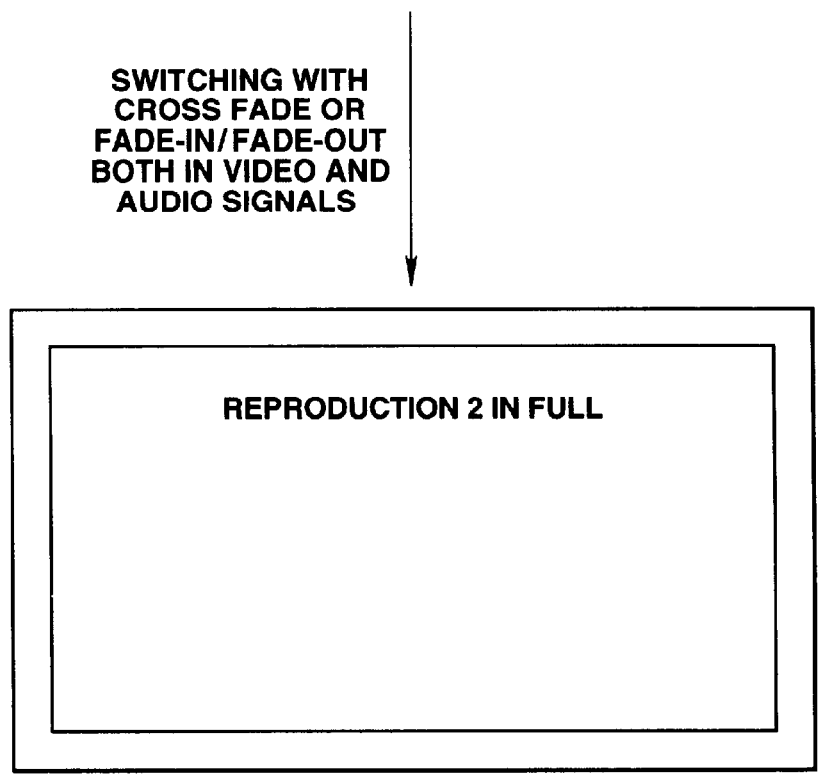

Moreover, in this video signal recording and/or reproduction apparatus, by providing a configuration of FIG. 10 as the aforementioned display control block 6, it is possible to carry out a fade processing such as a cross fade or fade-in/fade-out when switching from a video signal of Reproduction 1 to Reproduction 2 during a reproduction as shown in FIG. 11.

Figure 12A:
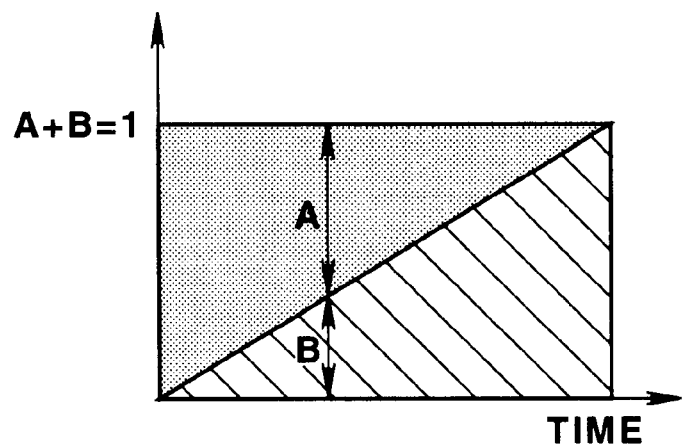
FIG. 12 explains a change of a coefficient in the aforementioned cross fade processing and the fade-out/fade-in processing.
Figure 12B:
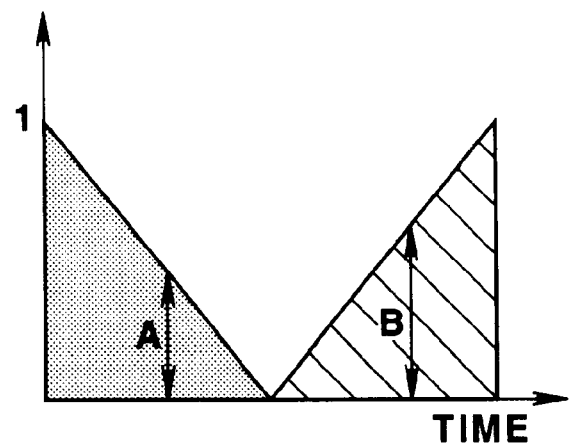

As shown in FIG. 10, the display control block 6 includes: a multiplier 6a and a multiplier 6b for multiplying an expanded video data from the data expansion processing system 23a and the data expansion processing system 23b, by a coefficient A and a coefficient B changing as shown in FIG. 12A and FIG. 12B, and an adder 6c for adding the multiplied outputs from the multiplier 6a and the multiplier 6b.

During the cross fade, the aforementioned coefficients A and B change as shown in FIG. 12A. Accordingly, the reproduction signal supplied to the output terminal 10 after addition in the adder 6c via the multipliers 6a and 6b changes from the video signal of Reproduction 1 to the video signal of Reproduction 2 with a cross fade in the video signal.

During a fade-out and fade-in, the aforementioned coefficients A and B change as shown in FIG. 12B. Accordingly, the reproduction signal supplied to the output terminal 10 after addition in the adder 6c via the aforementioned multipliers 6a and 6b is changed from the video signal of Reproduction 1 to the video signal of Reproduction 2 with a fade-out and a fade-in.

Consequently, when video signals of channels being reproduced are switched from Reproduction 1 to Reproduction 2, no unnatural disconnection is caused.

Figure 13A:
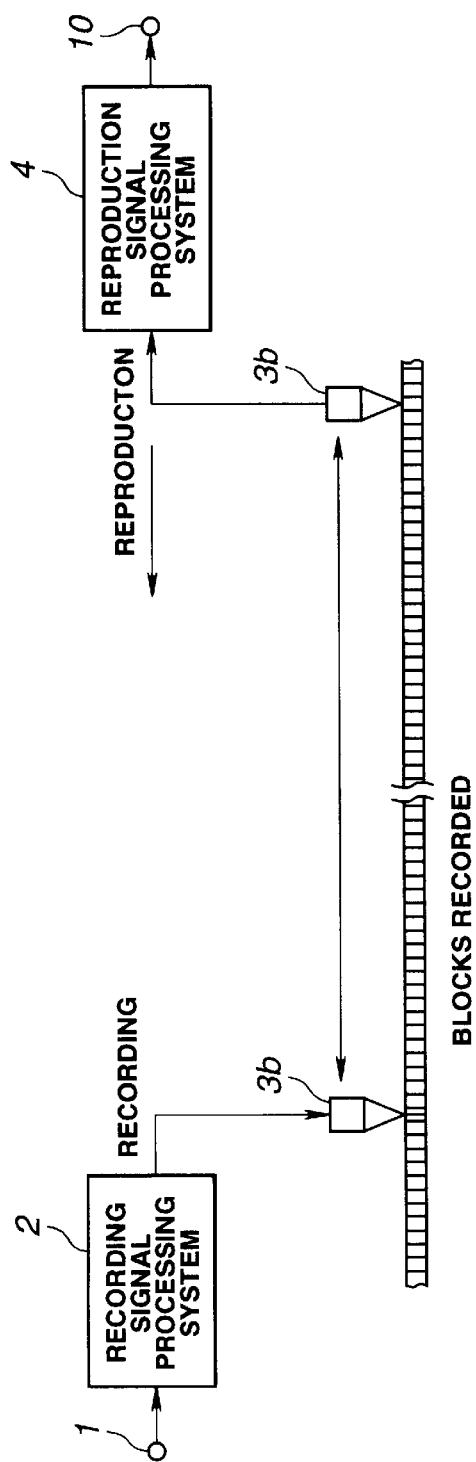
FIG. 13 schematically shows a concept of a catch-up reproduction carried out in the aforementioned video signal recording and/or reproduction apparatus.
Figure 13B:
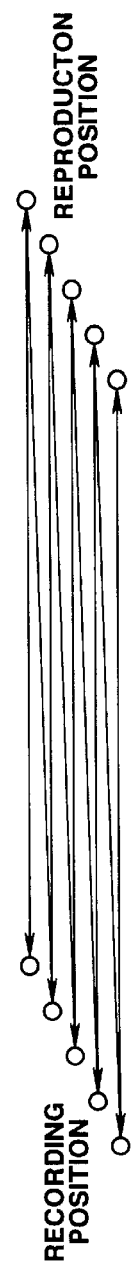
Figure 14A:
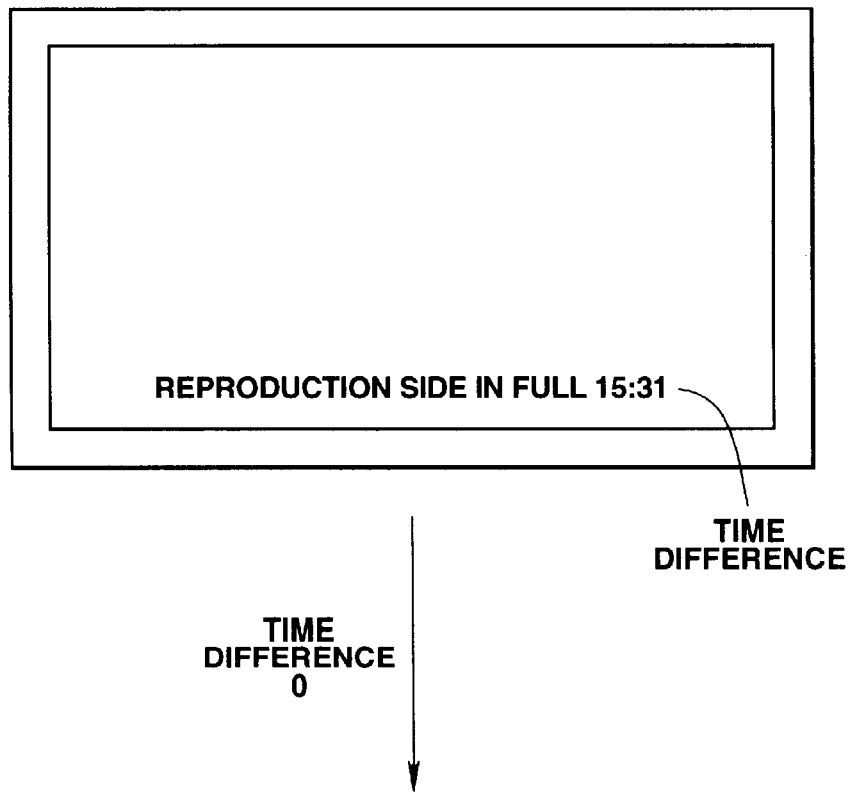
FIG. 14 explains a video signal displayed according to the catch-up reproduction shown in FIG. 13.
Figure 14B:
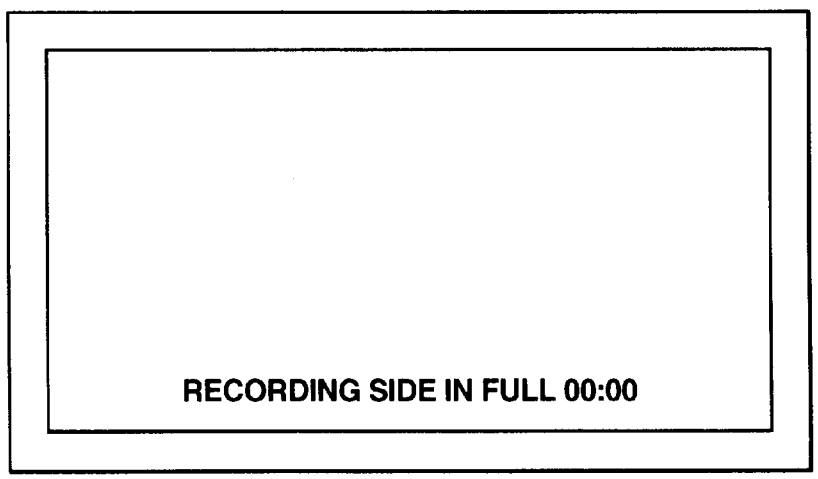

It should be noted that in the aforementioned video signal recording and/or reproduction apparatus, if the aforementioned recording mode selection is followed by selection of the aforementioned reproduction mode and if the reproduction processing speed in the aforementioned reproduction signal processing system 4 is faster than the recording processing speed in the aforementioned recording signal processing system 2, then according to the concept as shown in FIG. 13, it is possible to cause the display control block 6 to display the time difference between the video signal during the reproduction and the video signal during the recording as shown in FIG. 14A. When the time difference has become zero, for example, only the video signal of the recording side can be displayed in full screen as shown in FIG. 14B.

Explanation will be given on the catch-up reproduction shown in FIG. 13. The term "catch-up reproduction" means a reproduction of a program whose recording has already been started. For this, the optical head 3b is moved while being switched between a recording signal from the recording signal processing system 2 and a reproduction signal from the reproduction signal processing system 4. Because the reproduction processing speed by the reproduction signal processing system 4 is faster than the recording processing speed of the recording signal processing system 2, a time difference between the recording and the reproduction is reduced during a catch-up reproduction. That is, the optical head is alternately switched between the recording position and the reproduction position while reducing the distance between the reproduction position and the recording position.

Figure 15:
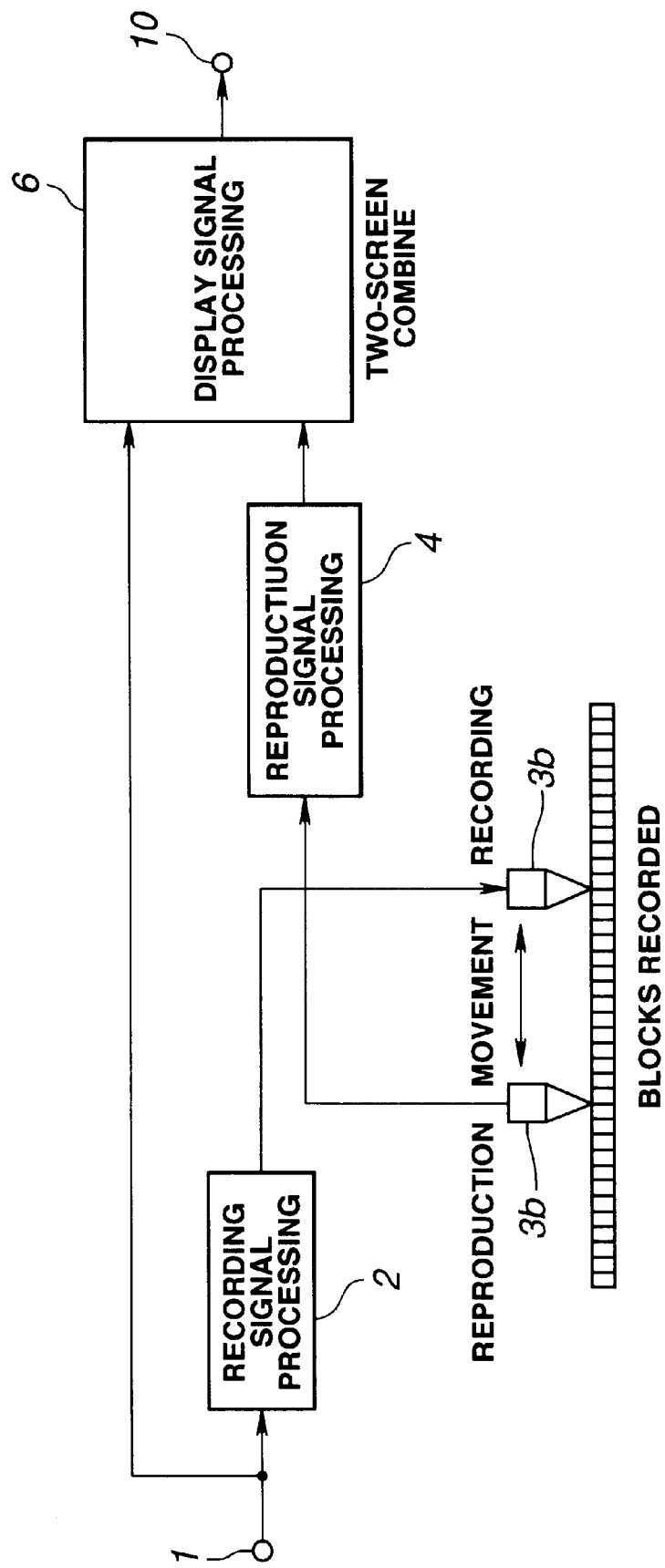
FIG. 15 schematically shows a concept of an operation during a video insert carried out in the aforementioned video signal recording and/or reproduction apparatus.

Moreover, in this video signal recording and/or reproduction apparatus, according to a concept as shown in FIG. 15, it is possible to overwrite an insert screen on an erase screen by moving the optical head while switching between a recording and a reproduction.

Figure 16A:
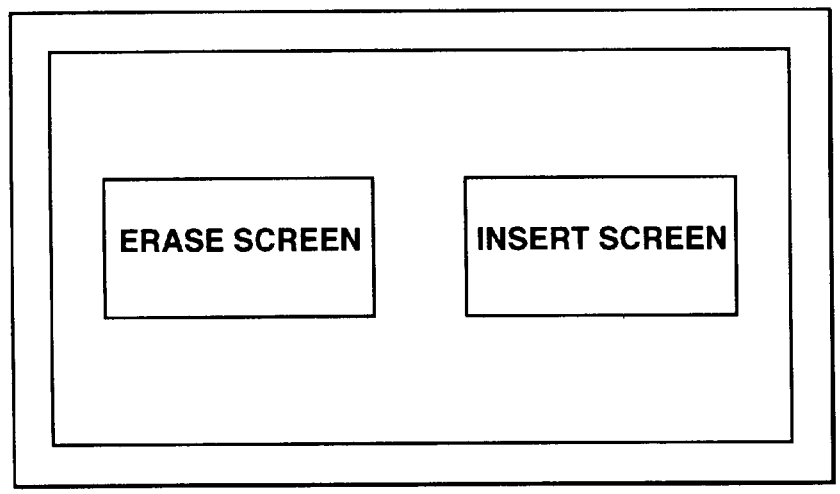
FIG. 16 explains a video signal displayed according to the concept shown in FIG. 15.
Figure 16B:
Figure 16B:
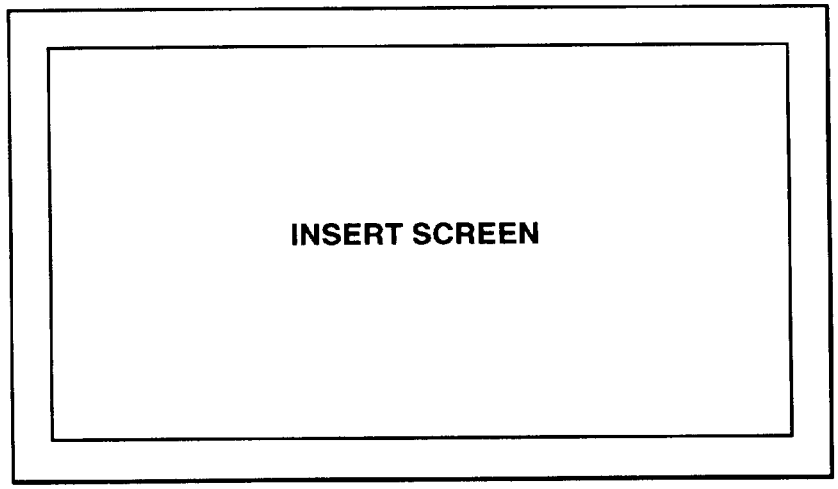

In this case, the display signal processing system serving as the display control block 6 shows the erase screen and the insert screen as shown in FIG. 16A on the monitor 8. When the overwrite is complete, only the insert screen is displayed as shown in FIG. 16B.

It should be noted that the signal recording and/or reproduction apparatus according to the present invention is not to be limited to the aforementioned embodiment. For example, it is also possible to carry out the fade-in/fade-out processing upon a reproduction switching of an audio signal.

Moreover, it is possible to realize a simultaneous reproduction of more than two channels such as three channels.

Furthermore, the recording medium may be other than the aforementioned optical disc such as a magneto-optical disc, a magnetic disc, or a semiconductor memory.

The signal recording and/or reproduction apparatus and method according to the present invention enable to visually show a user the relationship between a video signal being recorded and a video signal being reproduced during a simultaneous recording/reproduction.

Moreover, the signal recording and/or reproduction apparatus and method according to the present invention enable to visually show a user the relationship between two video signals being recorded during a simultaneous two-channel recording.

Moreover, the signal recording and/or reproduction apparatus and method according to the present inveniton enable to visually show a user the relationshiop between two video signals being reproduced during a simultaneous two-channel reproduction.

What is claimed is:

1. Signal recording apparatus operable in a multiple recording mode for multiple recording of a plurality of video signals and operable in a partial recording mode for partial recording of a plurality of video signals onto a disc recording medium, comprising:

recording processing means for processing said plurality of video signals to be recorded onto said disc recording medium;

a video display; and control means for controlling said video display to simultaneously display said plurality of video signals while being recorded onto said disc recording medium by said recording processing means when said multiple recording mode is selected, and for controlling said video display to display a portion of at least one of said plurality of video signals to be recorded onto said recording medium by said recording processing means when said partial recording mode is selected.

2. The apparatus of claim 1, wherein when said video display completes the display of at least one of said plurality of video signals, said control means controls said video display to display the remaining video signal in a size corresponding to said remaining video signal.

3. The apparatus of claim 2 wherein said plurality of video signals are video signals of two channels, and when the recording of one of said video signals onto said recording medium is completed, said control means controls said video display to display only the other video signal as a full screen display.

4. The apparatus of claim 1 wherein said plurality of video signals are video signals of two channels; and further including channel switching means selectively operable to switch between said video signals of said two channels; and wherein said control means controls the video display to display the switched video signals with fade processing.

5. The apparatus of claim 4 wherein said video signals of said two channels are accompanied by audio signals and said control means effects fade processing of said audio signals when said video signals are switched.

6. A method of recording video signals and operable in a multiple recording mode for multiple recording of a plurality of video signals and operable in a partial recording mode for partial recording of a plurality of video signals onto a disc recording medium, said method comprising the steps of:

processing said plurality of video signals to be recorded onto said disc recording medium; and controlling a video display to simultaneously display said plurality of video signals while being recorded onto said disc recording medium by said recording processing when said multiple recording mode is selected, and controlling said video display to display a portion of at least one of said video signals to be recorded onto said disc recording medium by said recording processing when said partial recording mode is selected.

7. The method of claim 6, wherein when said video display completes the display of at least one of said plurality of video signals, said video display is controlled to display the remaining video signal in a size corresponding to said remaining video signal.

8. The method of claim 7 wherein said plurality of video signals are video signals of two channels, and when the recording of one of said video signals onto said recording medium is completed, said video display is controlled to display only the other video signal as a full screen display.

9. The method of claim 6 wherein said plurality of video signals are video signals of two channels; and further comprising the step of switching between said video signals of said two channels; and wherein said video display is controlled to display the switched video signals with fade processing.

10. The method of claim 9 wherein said video signals of said two channels are accompanied by audio signals, and further comprising the step of processing said audio signals when said video signals are switched.

* * * * *